Fig. 3.

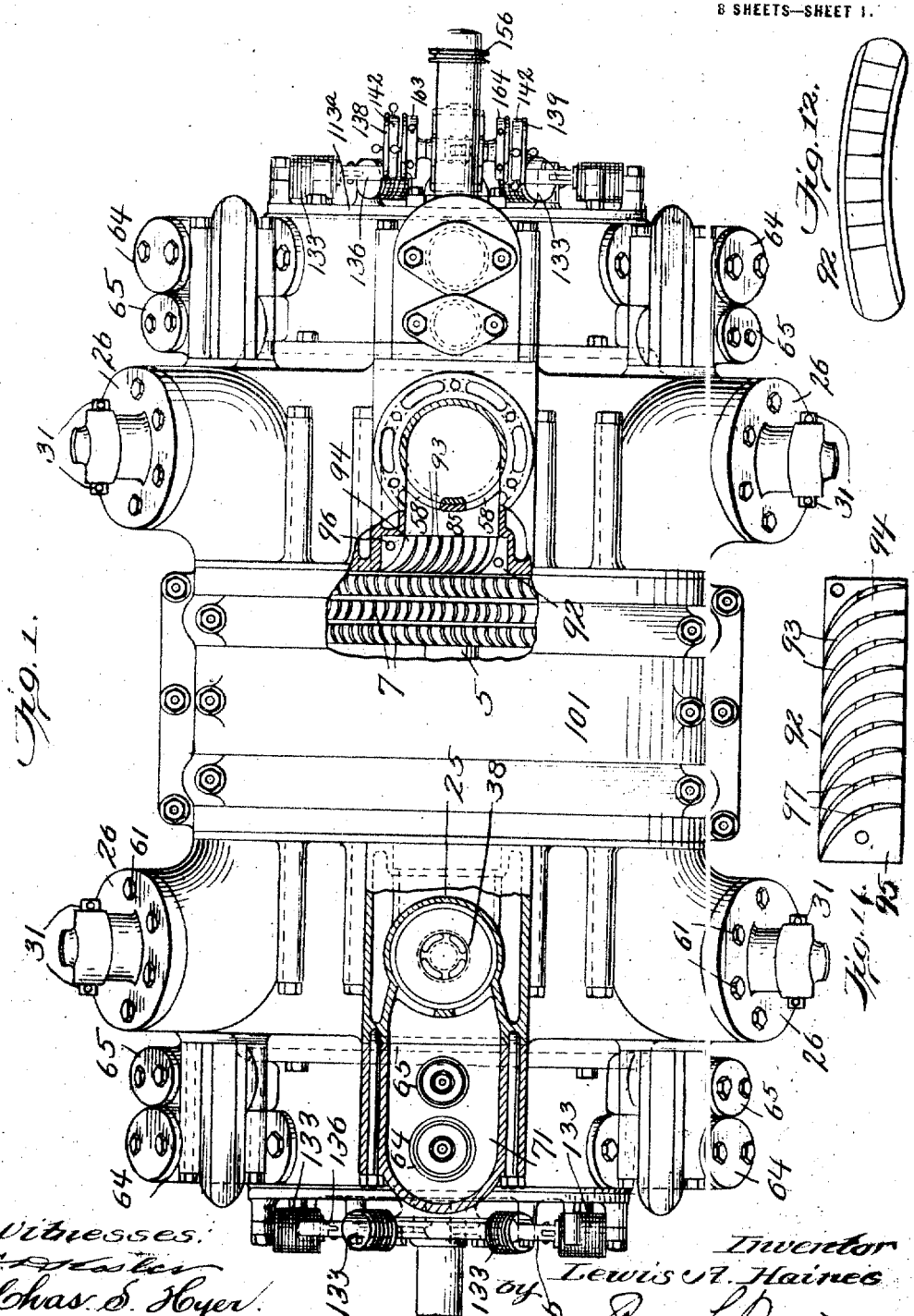

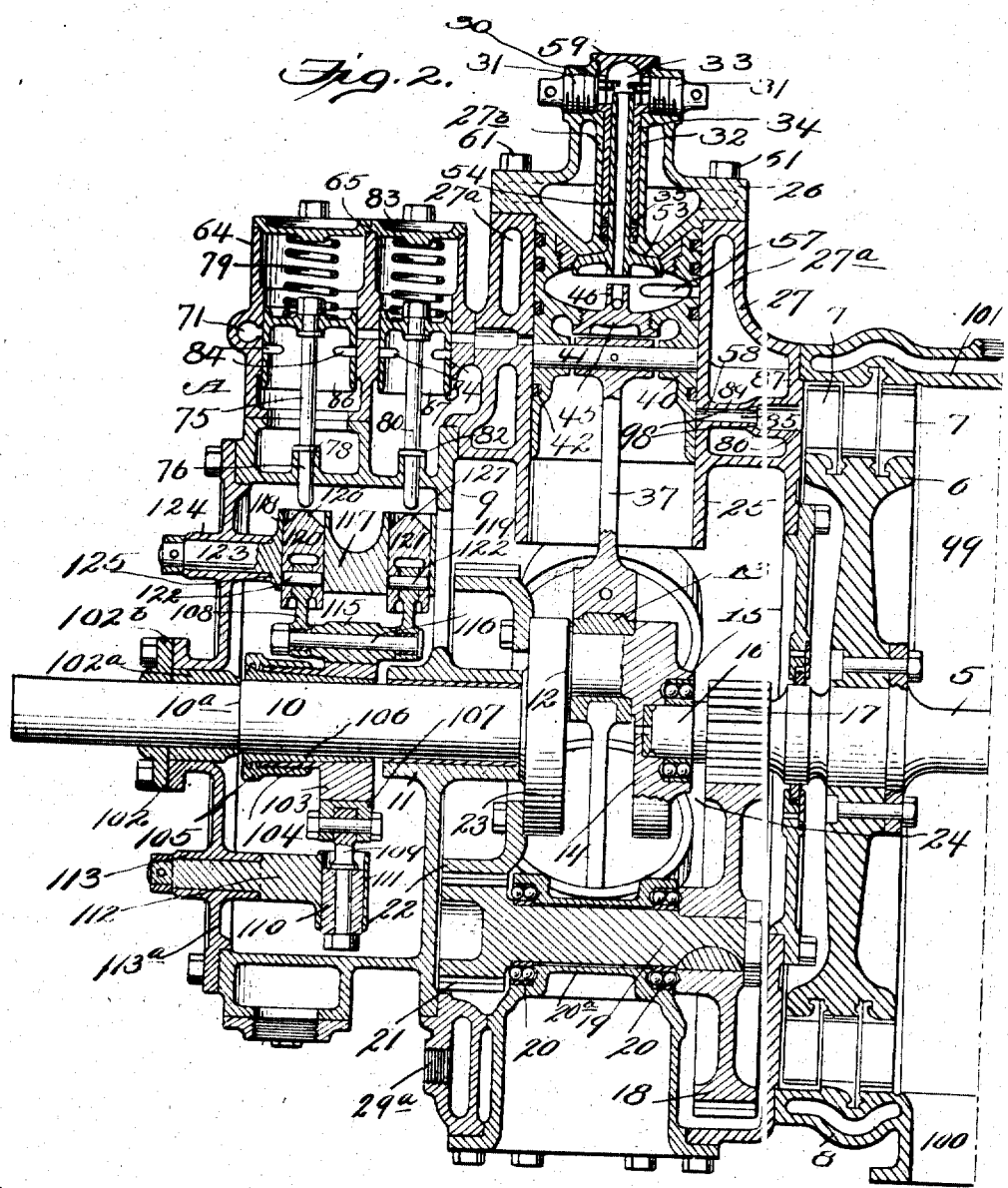

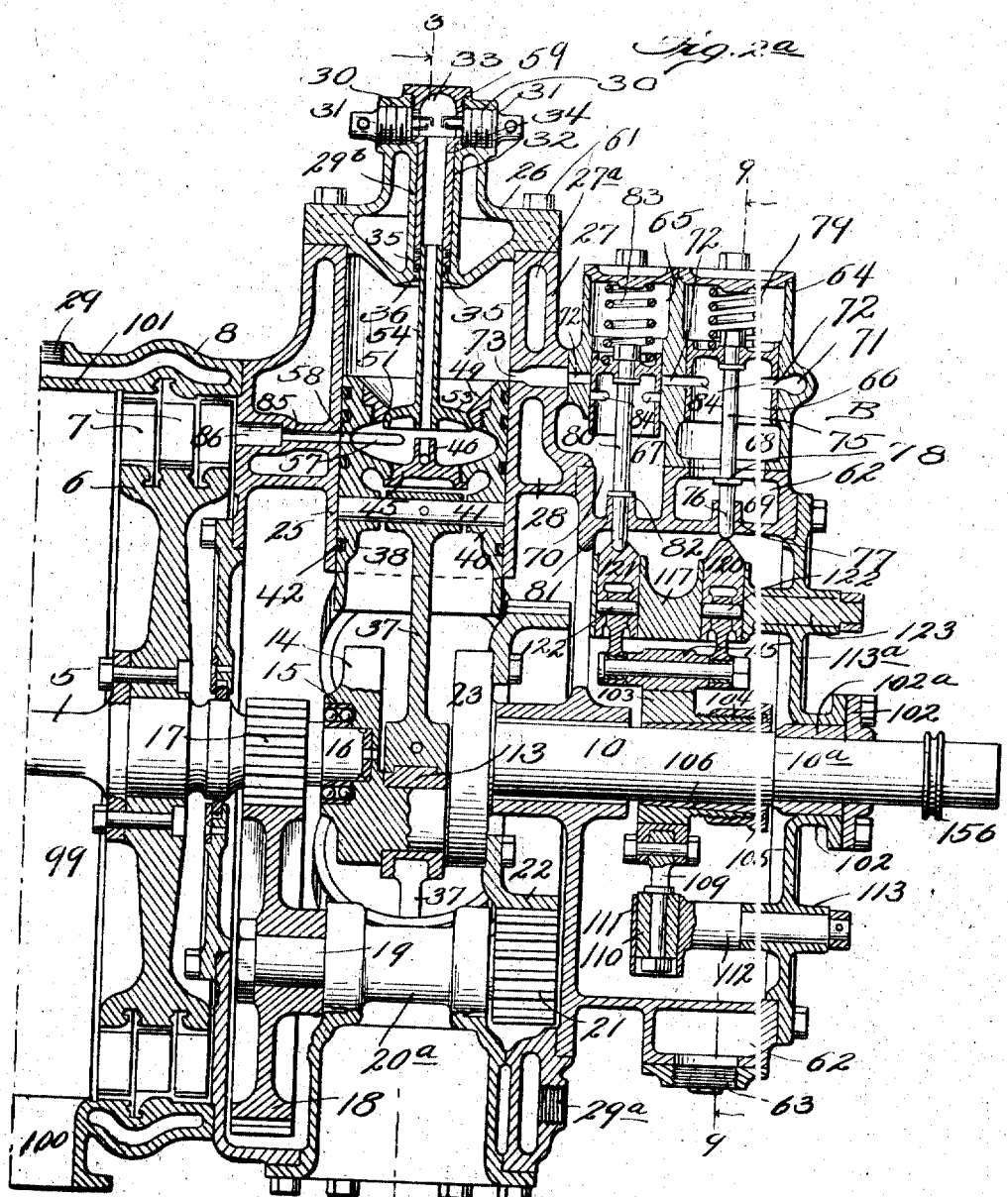

L. A. HAINES.
GAS TURBINE.
APPLICATION FILED OCT. 9, 1915.
1,219,298.
Patented Mar. 13, 1917.
8 SHEETS—SHEET 5.
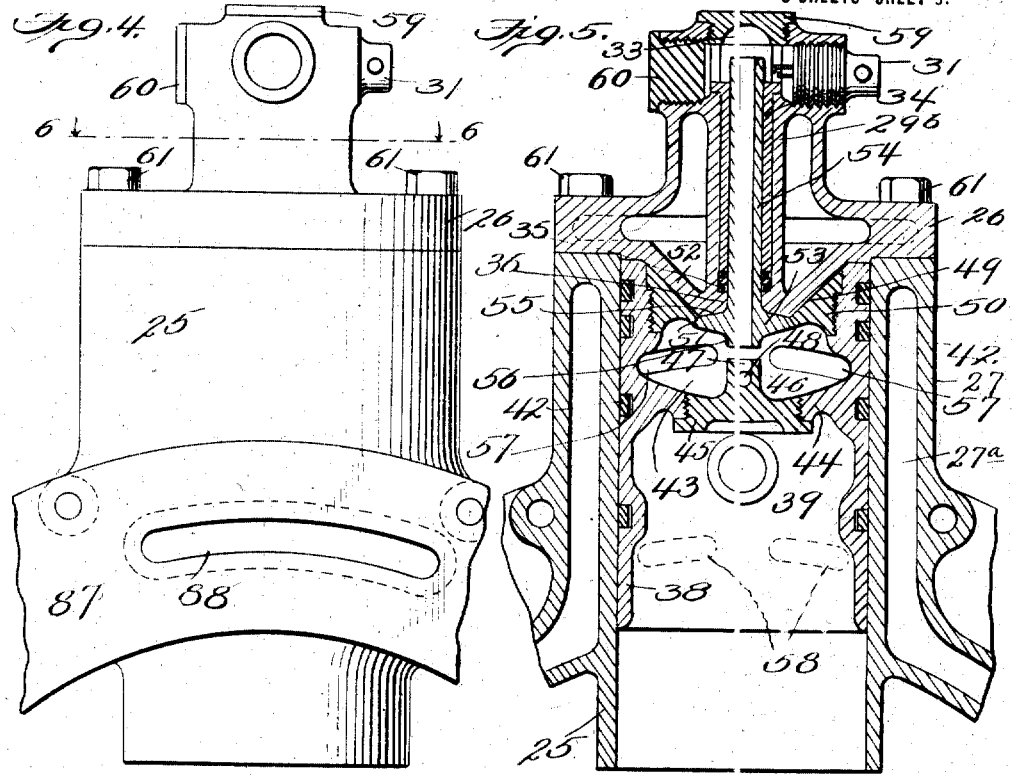
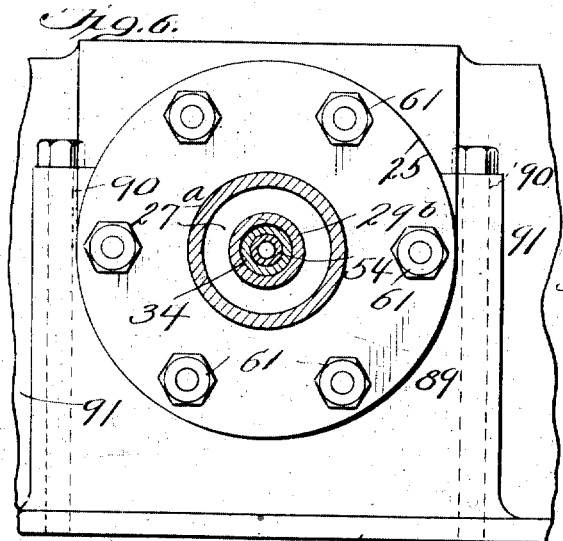
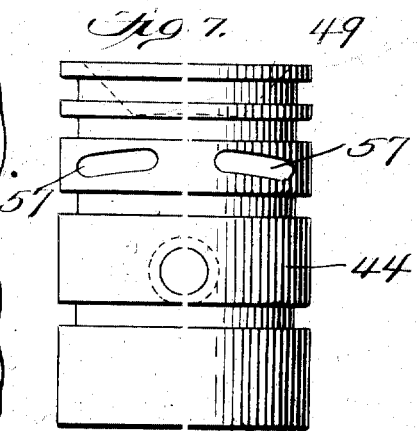
Witnesses
Chas. S. Hyer.
Inventor
Lewis A. Haines
by
Attorney

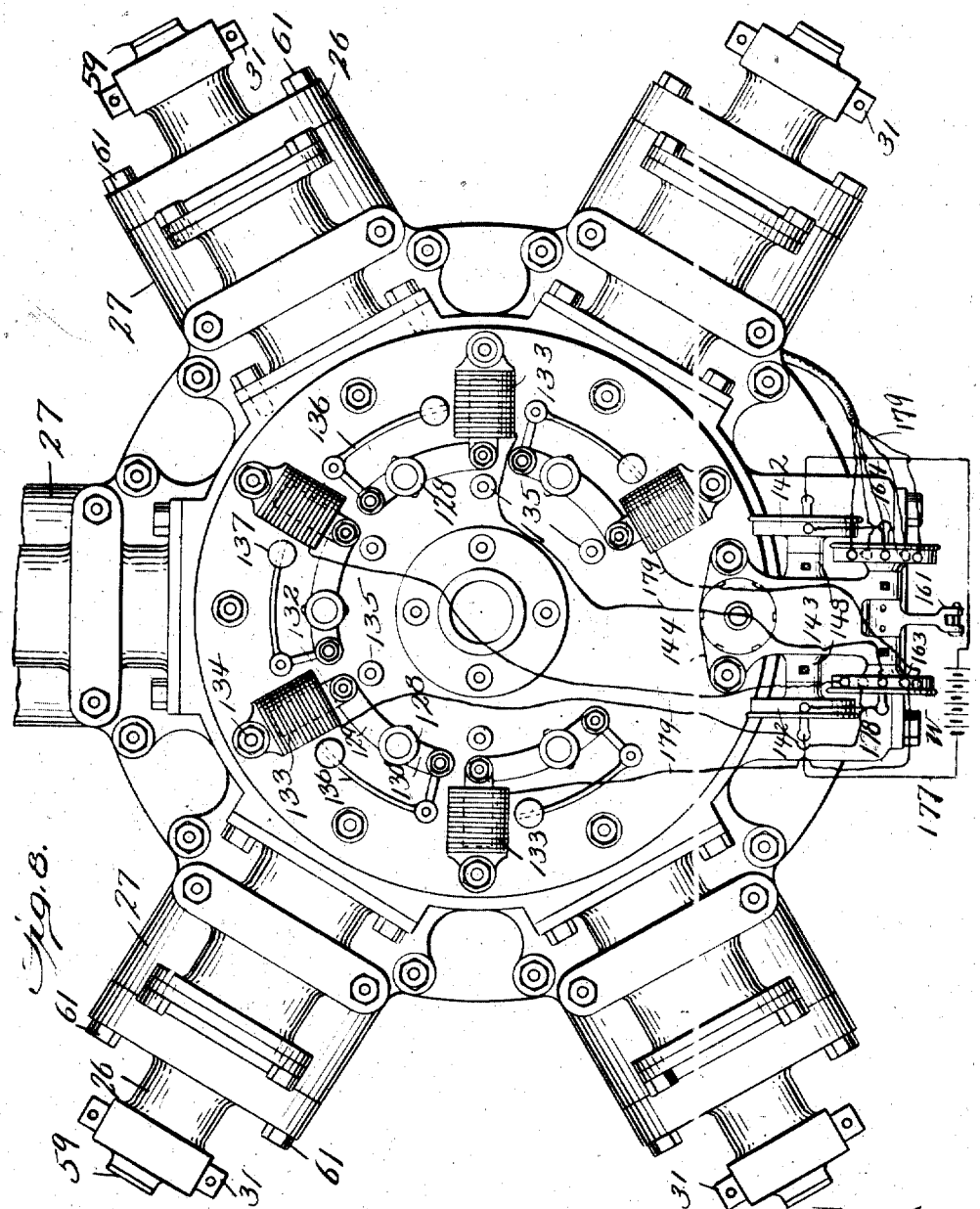

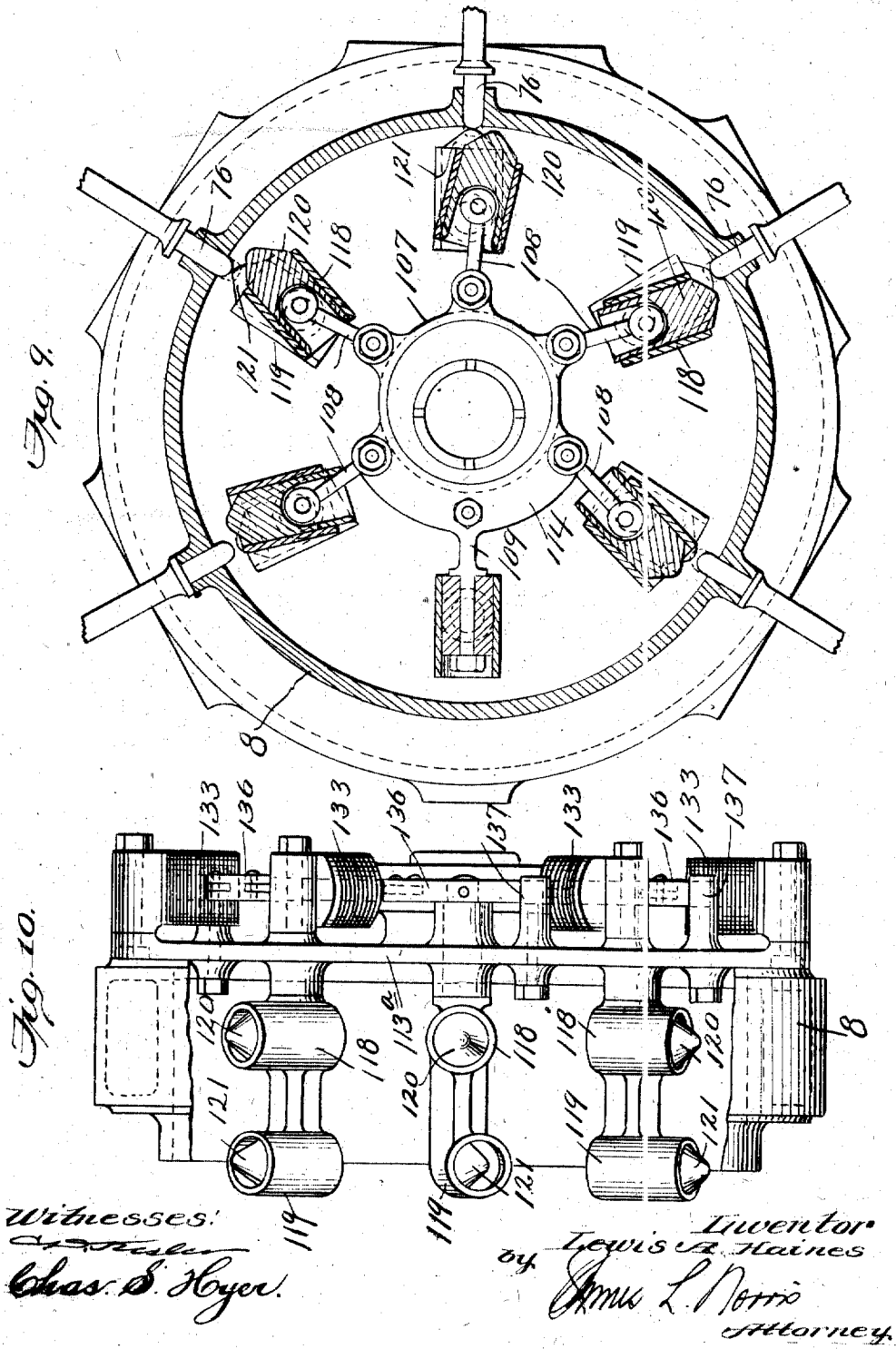

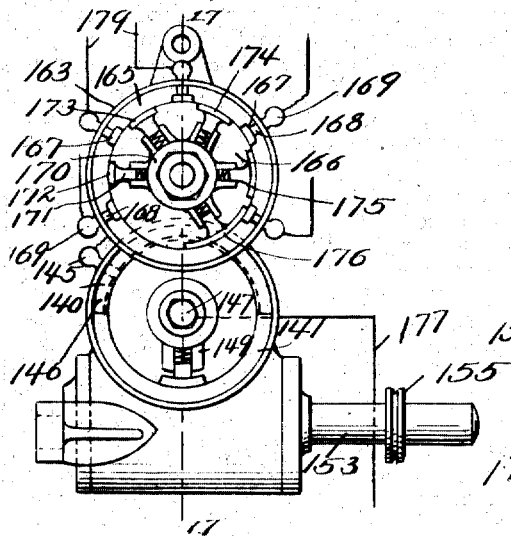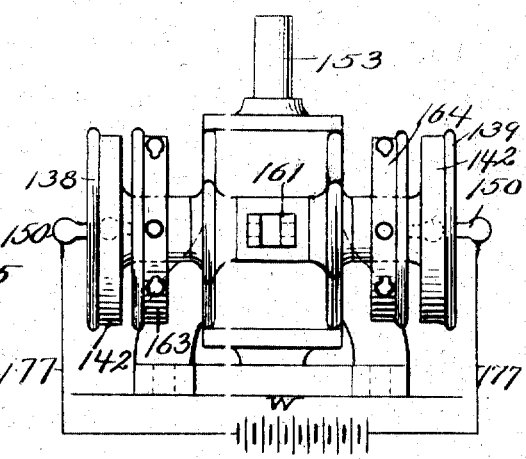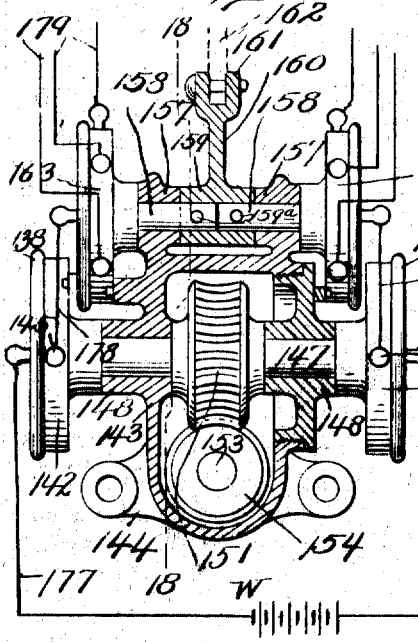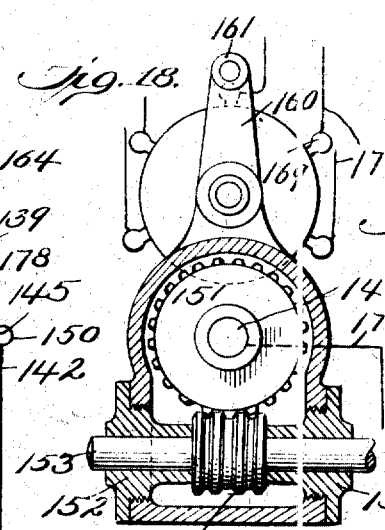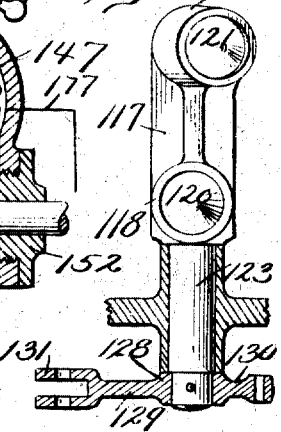

UNITED STATES PATENT OFFICE.

LEWIS A. HAINES, OF COLUMBUS, OHIO.

GAS-TURBINE.

1,219,298.   Specification of Letters Patent.   Patented Mar. 13, 1917.

Application filed October 9, 1915. Serial No. 55,048.

*To all whom it may concern:*

Be it known that I, LEWIS A. HAINES, a citizen of the United States, residing at Columbus, in the county of Franklin and State of Ohio, have invented new and useful Improvements in Gas-Turbines, of which the following is a specification.

This invention relates to gas turbines of the internal combustion type of that class wherein a part of the working organization is permitted to cool down and remain propulsively inactive while another portion of the organization is receiving the explosive medium and effectively driving a turbine on a shaft operatively connected to both parts of the working organization. In gas engines of the turbine class using an explosive motive agent a highly heated condition of the driving elements ensues and it is essential that the temperature be automatically controlled to reduce as much as possible the structural deterioration of the driving means with which the highly heated explosive agent comes in contact. A gas turbine of this type to be commercially effective must be reliably automatic in its operation, both as to the alternating driving activity of the opposing parts of the turbine and also as to supply, compression and combustion of the explosive medium and the delivery of the burnt explosive medium to the turbine elements. The present improved turbine is a development of the turbine disclosed in my pending application Serial No. 829,283, filed April 3, 1914. The present improved construction of gas turbine embodies essentially the same elements as disclosed in my pending application aforesaid, except in the features of improvement hereinafter specified and that the number of cylinders is reduced to five, but this reduction does not in the least affect the operation of the mechanism and the number may be greater or less in accordance with the general proportions of the turbine. In the present instance the mechanism for automatically governing the operation of the cylinders and pistons, and whereby the alternation of the working groups of cylinders and pistons may be regularly effected from the power shafts, and whereby also the controller for the feed of the explosive medium and air may be actuated when the variation in the load requires, is materially simplified in structure and has a more positive operation. The present improved turbine, while mainly intended and organized for alternate operation of groups of cylinders, pistons and motive agent or gas and air feeding mechanisms, is distinguished from my prior constructions in that it is also operable with a certain number of each of the groups of devices in the two coöperating turbine organizations at one and the same time so that the motive agent may be active to a certain extent on the two turbines by connecting up the electrical mechanism, including the timers, in a manner which will be more fully hereinafter explained. The improved gas turbine may or may not be used with a governor mechanism, and it is also adapted to be employed as driving means for an automobile and having a part thereof provided with a shaft which may be cranked as in starting an automobile, as will be readily understood. The improved gas turbine embodies many features of construction and novel combinations all conjointly operating to render the entire organization effective in its desired actuation as will be hereinafter more fully described in preferred form.

In the drawings:

Figure 1 is a top plan view, broken away in part and shown in section, of a gas turbine embodying the improved features of the invention.

Fig. 2 is a longitudinal vertical section of one-half of the improved gas turbine.

Fig. 2ª is a longitudinal vertical section of the remaining half of the improved gas turbine.

Figure 3:
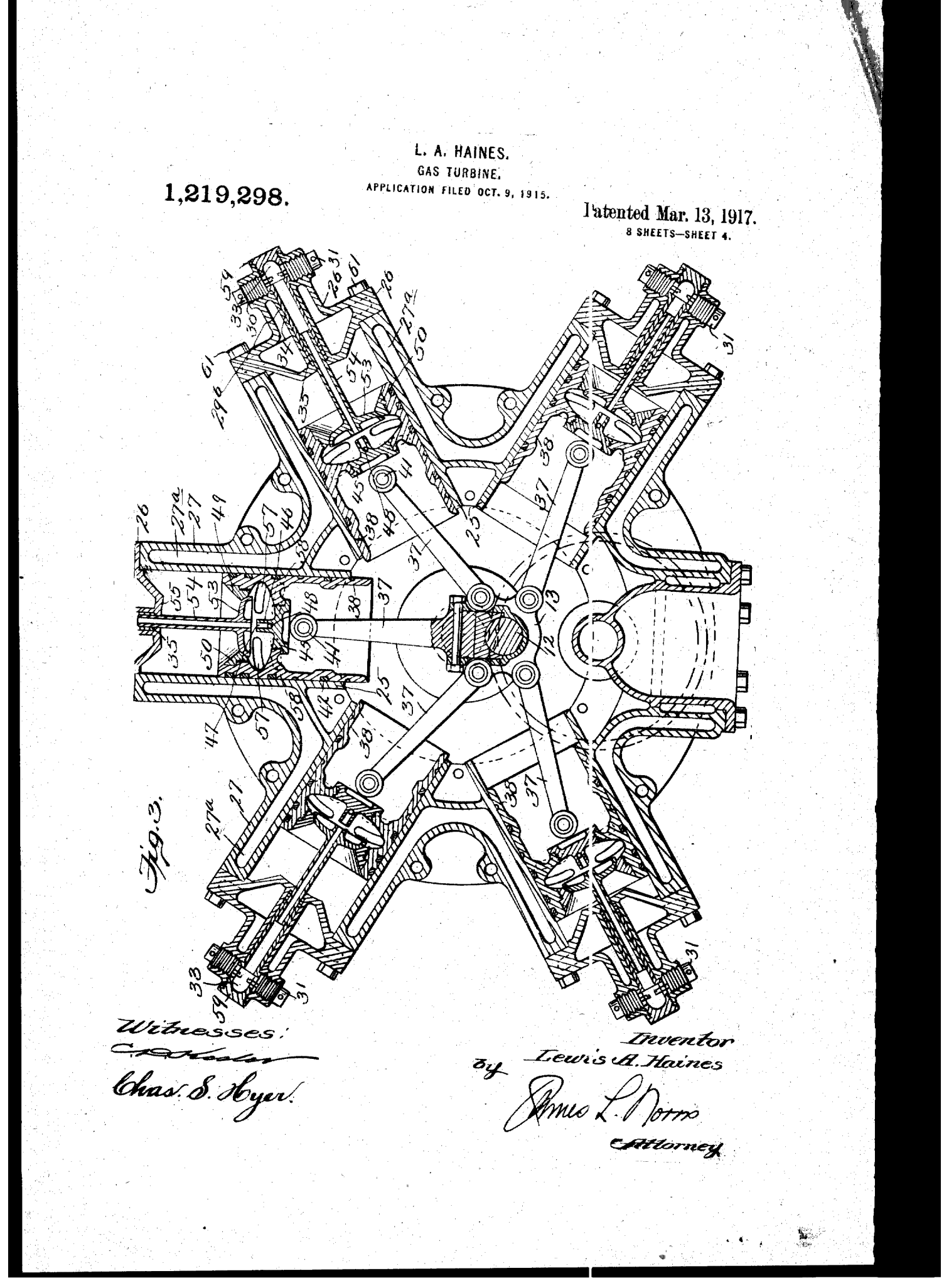

Fig. 3 is a cross-section taken in the plane of the line 3—3, Fig. 2ª, and particularly showing the compressors or pistons and connected and coöperating mechanism therefor.

Fig. 4 is a detail side elevation of one of the cylinders constituting one of the groups of cylinders and a portion of the flange located near the adjacent turbine.

Fig. 5 is a transverse vertical section through one of the cylinders and its piston or compressing mechanism showing the latter mechanism in a different position from that illustrated by Fig. 3.

Fig. 6 is a horizontal section taken in the plane of the line 6—6, Fig. 4, and particularly showing the relative position of the cylinder to the casing or framing adjacent to the one turbine.

Fig. 7 is a detail elevation of one of the pistons or compressors which coöperate with each cylinder.

Fig. 8 is an end elevation of the turbine particularly showing the valve gear or the means for regulating the operation of the motive agent and air valves and also the controlling mechanism primarily governing the said regulating mechanism for the valves.

Fig. 9 is a section taken in the plane of the line 9—9, Fig. 2ª.

Fig. 10 is a top plan view of a part of the valve gear or valve regulating mechanism, parts of the frame being broken away to illustrate the components of this particular mechanism.

Figs. 11 and 12 are detail views of the guide blades constituting the outlet means for the motive agent from the cylinder pistons or compressors and cylinders relatively to the turbine.

Figs. 13 and 14 are further detail views of portions of the valve controller and regulator mechanism.

Fig. 15 is an end elevation of the timer and regulator mechanism.

Fig. 16 is a detail top plan view of the regulator mechanism, the timer mechanism being disassociated relatively thereto.

Fig. 17 is a transverse vertical section taken in the plane of the line 17—17, Fig. 15.

Fig. 18 is a section taken in the plane of the line 18—18, Fig. 17.

The numeral 5 designates a turbine or main driving shaft, see Figs. 2 and 2ª, extending through and freely running in the intermediate portion of the complete organization and having turbines 6 thereon and secured to opposite extremities thereof, said turbines being provided with any approved type of turbine blades 7 adapted for the purpose and freely rotating within annular water-jacket extensions 8. Each turbine 6 is arranged in the present instance for conjoint operation with means for supplying a motive agent thereto, or with individual organizations comprising a plurality of cylinders and pistons and a power shaft, together with motive agent supply devices and controlling timing and regulating mechanisms, the individual organizations being respectively indicated by the reference characters A and B, as clearly illustrated by Figs. 2 and 2ª. A detail description of the organization indicated as a whole by the reference character A will suffice for that indicated by the reference character B, as both organizations are of duplicate construction in every particular and each comprises a suitable open framework 9 of such general contour and structural inter-relation as to provide a positive and reliable support and means of attachment for the several instrumentalities which will be presently explained. This framework 9 will be constructed as light as possible, but of a strong and durable nature to resist breakage by ordinary weight stress and vibration that may be imparted thereto from the working parts. The organizations A and B each includes a power shaft 10 mounted to rotate in an elongated bearing sleeve 11 suitably held in connection with the frame and provided with a crank 12 loosely engaged by a crank box or disk 13, the inner crank member 14 being cored out or recessed, as at 15, to provide a rotating bearing seat for the adjacent reduced end 16 of the turbine or main driving shaft 5. The bearing in the seat 15, which will hereinafter be termed a rotating bearing, comprises a hard metal ring organization, balls and end thrust disks or plates or the usual appurtenances of bearings of this type and similar to the bearing disclosed in my aforesaid application. The rotating bearings materially add to the effective operation of the turbine or main driving shaft 5 by taking off the wear and end thrust from the opposite ends of said shaft and also in reducing the friction on the ends of the shaft to a minimum. Each end of the turbine or main driving shaft 5 is also formed or provided with a pinion 17 held in continual mesh with a gear 18 fast on a counter-shaft 19 mounted in antifrictional bearings 20 held by frame pieces 20ª bolted to the frame, said counter-shaft having a pinion 21 on the end thereof opposite that carrying the gear 18, the pinion 21 meshing with a gear 22 secured to the inner member or arm 23 of the crank 12. Through the medium of this gearing the power shaft 10 is properly timed in its operation or rotation relatively to the turbine or main driving shaft 5. The dimensions of the several pinions and gears interposed between the turbine or main driving shaft and each power shaft may be modified or regulated at will in accordance with the required speed of the power shafts, and it will be seen that the interposition of the gears between the ends of the turbine or main driving shaft 5 and the cranks 12 of the power shafts results in a direct and positive operation of the power shafts in a minimized space and without liability of fluctuation of rotation of said shafts. Another advantage of the rotating bearings on the opposite ends of the turbine shaft 5 is the material saving in the structural elements necessary for practically mounting the turbine shaft, and all of the components of these bearings will be of very hard metal so as to resist wear and maintain the said turbine or main driving shaft 5 and the turbines 6 in true running position and revolving in the same direction as the turbine shaft 5 to eliminate friction. The crank member 12 of each power shaft 10 is in effect a part of the latter shaft and is in direct alinement therewith, said crank member 12 being mounted in a suitable opening 24 formed in a portion of the frame which may be so shaped and constructed as to accommodate the application thereto of the several parts just described, the various members of the frame being suitably secured or associated to solidify or stabilize the supporting means for each organization A and B and the turbine as a whole. The object of the separate power shaft for each organization A and B is to permit the turbine or main driving shaft 5 to run freely at a predetermined high rate of speed and the power shafts 10 at a correspondingly low rate of speed so as to effect a regular and practical operation of the dual mechanisms for controlling and regulating the feed, compression, explosion and combustion of the motive agent or medium and to insure constancy in the forceful accumulation and delivery of the motive agent or medium to the turbines 6, the gearing interposed between the opposite extremities of the turbine or main driving shaft and the power shafts serving as a compensating means which will produce a ratio of speed as may be desired or found necessary in operating certain mechanisms with which the improved gas turbine may be used.

Radially arranged around each power shaft 10 is a plurality of cylinders or shells which in the present instance are shown as five in number and indicated by the reference character 25, as clearly shown by Figs. 2 and 2ª, all the cylinders being cast together within the adjacent portions of the frame 9. Each cylinder or shell 25 is fully open at its inner end and has an outer closing head 26, the several cylinders having portions of the frame 9 providing inclosing casings 27 therefor with open spaces 27ª therein to provide a water jacket, as as 28, the water jackets of all of the cylinders being in circulating communication and also in communication with the water jacket extensions 8 so that all of the water jacket spaces used in the turbine may be regularly supplied with water from a suitable connection, as at 29, and drained at any suitable point, as at 29ª, so as to cause a continual circulation of water around the cylinders and in the extensions for obvious reasons. By means of the communicating water spaces, or the water jacket, extending fully throughout the entire frame, the several mechanisms, and particularly the cylinders and pistons, are cooled and maintained in a more effective working condition. The application of packing material around the cylinders or adjacent to the latter, as fully explained in my application aforesaid, is not used in the present structure. Each cylinder head 26 is hollow and formed with a double wall, as at 29ᵇ, the purpose of this latter construction being to prevent radiation of heat from and undue heating of each cylinder head by providing the same with a water jacket which is open to the other water spaces around the various parts. Each cylinder head 26 is formed with opposite openings 30 extending sidewise thereinto in diametric relation for the introduction of sparking plugs, as at 31, suitably connected up to a magneto distributing organization similar to that shown in my pending application. The cap 26 has a central bore 32 opening into the spaces 30 in which the sparking plugs are mounted, the inner active extremities of the sparking plugs or the sparking terminals being disposed over the outer terminal of each bore 32, a small chamber or space 33 being formed in the outer reduced end of each head 26 beyond the outer end of the bore 32 and adjacent to the sparking terminals of the plugs 31 so that the sparking action of the plugs will be effective without the least obstruction through the bore 32. Within the bore 32 a sleeve or liner 34 is mounted, and at the inner extremity thereof are suitable packing rings 35, the inner terminal of the bore 32 being reduced, as at 36; and the packing rings 35 rest against the shoulder produced by the reduction of the bore, as clearly shown in Figs. 2 ard 2ª. It will be seen in the present improved construction that the cap 26 is relieved of all valve mechanism as well as air and motive agent supply connections, thus essentially reducing or minimizing the structure relatively to that disclosed in my pending application hereinbefore specified and as a consequence reducing the cost of construction of the turbine as a whole. In fact, the present improved turbine has the parts thereof minimized to a very great extent relatively to the the structure disclosed by my pending application above noted, and the larger portion of the working parts is inclosed within the surrounding shell of the complete turbine organization, all of the intricate valves and valve operating devices embodied in my pending application being entirely dispensed with in the present improved construction.

The crank box or disk 13 engaging the crank 12 is eccentric with relation to said crank, and thereto piston rods 37 are movably attached and correspond in number to the cylinders 25. These piston rods 37 project radially into the inner open ends of the cylinders 25 and are movably connected to the inner extremities of pistons 38. As disclosed in my pending application aforesaid, one of the piston rods of each group has its inner extremity fixed to the crank box or disk 13 and the outer extremity movably attached to its piston similarly to the remaining piston rods and by thus fixing the inner extremity of one piston rod the crank box or disk 13 is maintained in proper position against wabbling or irregular movement and a positive operation of the disk relatively to the crank is insured. It will therefore be understood that the one piston rod which is fixed at its inner end to the crank box or disk 13 acts as a holding leg for the said disk, but in the performance of this function this piston rod will not be in the least restricted in its reciprocating and oscillating movements. The construction of the cylinders 25 and pistons 38 is clearly shown on an enlarged scale by Fig. 5, and it will be seen that the inner extremity of each piston is formed as a hollow chamber 39 and is also provided with trunnion bearings 40 for the trunnion or fulcrum 41 forming the connection for the piston rod 37, as shown by Figs. 2 and 2ª. The piston 38 is provided with suitable packing rings 42 to form a tight joint within the inner surface of the cylinder 25 with which the piston reciprocatingly coöperates. The outer extremity of each piston is formed with a combustion chamber 43 and in the inner wall 44 of said chamber a closing plug 45 is inserted by means of a screw-threaded joint and has a projecting stop 46 preferably integrally formed therewith and located centrally in the chamber 43, said stop being tubular and fully open to the chamber under normal conditions, as at 47. The stop projection 46 is in effect provided with a port opening out through the free end thereof; and communicating therewith or intersecting the said port and opening into the chamber 43 is a counter-port 48. The outer end of the piston 38 is recessed, as at 49, the recess having the contour of an inverted cone, and in said recessed end a valve seat 50 is secured around a valve opening 51. The cap 26 also has in inwardly projecting conical extension or member 52 which snugly fits in the recess 49 when the piston reaches the full limit of its outward stroke. The valve opening 51 has a valve 53 arranged to engage the same and the seat, the said valve being provided with an elongated tubular stem 54 frictionally fitted in the sleeve or tube 34 and engaging the packing rings 35. The inner extremity of the extension or member 52 is shaped or has a contour as at 55 similar to the top of the valve 53 so that the latter may bear closely thereagainst. The valve 53 also has an inner central extension or stop projection 56 which is adapted to contact with the projection 46, the opening through the stem 54 being continued through the valve and the stop projection 56, as clearly shown by Fig. 5. The opening 51 formed in the valve seat 50 converges in an outward direction and the edge of the valve 53 is correspondingly shaped, and as a consequence the valve cannot pull through the valve seat and therefore the said valve and its stem 54 must move with the piston 38 on the inward stroke of the latter; and during such inward stroke the valve 53 is drawn up tightly against the valve seat 50, as shown by Fig. 5. As hereinbefore specified, the tubular valve stem 54 has a sliding fit in the sleeve 34, and the friction between the valve stem and the said sleeve is strong enough to avoid loose movement of the valve stem and insure a tight closing fit of the valve 53 relatively to the seat 50. During the outward movement of the piston 38 the latter moves slightly in advance of the valve 53, as it were, the projection 56 of said valve contacting with the projection 46 of the plug 45, and therefore during the outward movement of the piston the valve 53 remains open and is moved outwardly through the medium of the projection 46 in engagement with the projection 56. Therefore, it will be understood that when the piston moves inwardly the chamber 43 is tightly closed, and likewise the said chamber is also closed when the piston is at the full limit of its outward stroke and just as the piston starts to return on its inward stroke. The chamber 43 is provided with elongated ports 57 which are adapted to register with corresponding ports 58 formed in the cylinder 25, as clearly shown in dotted lines by Fig. 5 and also illustrated in section by Figs. 2 and 2ª. The cap 26 is interiorly accessible through the medium of a top plug 59 and side plugs 60, one of which is shown in Fig. 5, and by thus constructing the outer extremity of the cap the sleeve or bushing 34 may be readily inserted in the bore 32, and, moreover, the outer chambered portion of the cap is thus made readily accessible for manipulation of all the parts as may be found necessary. The tubular valve stem 54 is of such length that when the piston 38 is at the outward limit of its stroke the upper end of said stem will extend into the chamber or space 33, as shown by Fig. 5, with the open end of said stem adjacent to the sparking terminals of the sparking plugs. The cap 26 as a whole is suitably secured in place on the frame by means of bolts 61, and by removing the said cap the cylinder with which it coöperates may be easily reached. This same structure is duplicated in all of the cylinders and the latter may be at any time internally inspected.

Adjacent to the outer end of each organization an annular motive medium or explosive agent chamber 62 is formed and at one extremity is provided with an inlet 63 adapted to be attached or connected up to a suitable motive medium or agent supply, it being preferable to use air and gas in proper proportions. Around the exterior of the end of the frame at each end of the complete turbine organization is a plurality of pairs of cylinders 64 and 65 respectively having pistons 66 and 67 therein, the cylinders 65 and their pistons 67 being materially smaller than the cylinders 64 and pistons 66. The inner extremities of the cylinders are open, the cylinders 64 each having an inner opening 68 coinciding with an outlet opening 69 in the outer wall of the chamber 32 and the inner ends of the cylinders 65 opening into an air space 70 which may be an open portion of the frame and supplied with air as may be desired. The cylinders 64 and 65 do not have communication and are surrounded by an annular chamber 71, as clearly shown by Fig. 1, both cylinders having ports 72 opening into the chamber; and as shown by Fig. 1 the said chamber 71 is materially larger than the diameters of the cylinders. The chamber 71 is horizontally disposed and has communication by means of a port 73 with the adjacent combustion cylinder 25, the construction and arrangement of the cylinders 64 and 65 and the chamber 71 being duplicate in relation to each cylinder 25. Each piston 66 is hollow and has a piston rod 75 extending inwardly through the chamber 62 and provided with an inner end 76 reciprocatingly mounted in a guide 77 formed in the inner wall of the said chamber 62, the piston rod having a stop 78 to limit the inward movement thereof. The outer end of the piston 66 is engaged by a spring 79 which is interposed between the said piston and the outer end of the cylinder 64, the said spring always operating to move its piston and piston rod inwardly the full limit when the piston rod 75 is unengaged by means which will be presently explained. The piston 67 of the cylinder 65 is similar in construction to the piston in the cylinder 64, and the said piston 67 has a piston rod 80 connected thereto and movable through an inner guide 81 formed in a part of the frame, the piston rod 80 also having a stop 82 to limit the inward movement thereof. Between the outer end of the piston 67 and the outer end of the cylinder 65 a spring 83 is interposed and operates to move the piston 67 inwardly into normal position or so that the stop 82 will engage the guide 81 and project the inner end of the piston rod 80 within operative adjacency to mechanism for regularly actuating the same. The pistons in the cylinders 64 and 65 also have ports or openings 84 in the side walls thereof which are adapted to register with the ports 72 to respectively feed the motive agent or explosive medium from the chamber 62 to the chamber 71 and thence to the adjacent cylinder 25 by way of the port 23, and air to the chamber 71 and to the cylinder, the motive agent or explosive medium being fed to the cylinder 25 as just explained at a time when the air feed is cut off or when the ports 84 of the piston 67 are out of registration relatively to the ports 72. Under ordinary normal operative conditions the pistons 67 in the cylinders 65 will not be operating at the time that the pistons in the cylinders 64 are active, and vice versa, the admission of air to the cylinders 25 being at a time when the cylinders are cooling off in the alternate operation of the two organizations or when one side of the organization is propulsively active and the opposite side inactive.

The ports 58 of the cylinders 25 open into horizontal discharge chambers 85, there being one of these chambers for each cylinder. Each chamber 85 is enlarged, as at 86, and passes through a partition plate 87 between the nearest turbine 6 and the adjacent organization A or B. The partition plate 87 circularly follows or conforms to the circular contour of the turbine adjacent thereto, and the enlarged portion of each chamber 86 passes through the said plate in the form of an elongated arcuate outlet port 88, as shown by Fig. 4. The chamber 85 has a frame or covering member 89 thereover and extends back to the cylinder, the said frame or cover member being secured by draw-bolts 90 engaging offsets 91 thereof and also the partition plate 87, as shown by Fig. 6. This arrangement renders the chamber 85 accessible by removing a portion of the frame to accommodate the introduction in the chamber adjacent to the outlet port 88 of a guide 92, shown by Fig. 1 in applied position and in detail by Figs. 11 and 12. Each guide 92 comprises a series of segmental blades 93 which extend at a tangent to the turbine blades 7 and have passages 94 therebetween. The guides are of the same arcuate contour as the outlet ports 88 and also correspond with the circular peripheral contour of the turbines. As shown by Fig. 1, the blades 93 terminate coincidently with the outer limit of the ports 88 and as hereinbefore specified are located in the enlarged portions 86 of the discharge chambers 85. The guides 92 have supporting plates 95 which are set into the enlarged portions 86 of the chambers 85 and secured and held in place by the cover members hereinbefore explained and by end fastenings or pins, as at 96, the upper edges of the blades having lugs or projections 97 which fit into corresponding seats in the cover members of the frame, and by this means the guides are firmly held in position and are prevented from moving or becoming displaced by vibration or from other cause. The inner edges of the plates 95 of the guides fit flushly against the offsets, as at 98, which are provided by the enlargements 86 of the chambers 85, as shown by Figs. 2 and 2ª and hence the blades have their intermediate portions exposed to the chambers 85 without any obstructing shoulders and whereby the burnt or consumed motive medium or agent is delivered to the turbine blades 7. The turbines in the present construction are similar in arrangement to those of my pending application aforesaid and consist of alternately arranged groups of turbine blades, as shown by Fig. 1, so as to render the rotation of the shaft 5 effective and to obtain the full force of the motive agent delivered to the said turbine by the blades 93 of the guides 92. After passing between the turbine blades 7 the motive agent or medium discharges in an exhaust space or chamber 99 between the turbines and from the latter is taken off through an outlet 100 by any suitable pipe connection, it being understood that the shaft 5 extends centrally through the chamber 99 and with the latter is inclosed by an outer intermediate shell or casing 101 which is removable to give access to the turbines for repair or other purposes as may be desired. Each of the blades 93 of the guide 92 is tapered from the center toward opposite ends, so that knife edges are provided at the receiving and outlet or discharge terminals of the blades to avoid resistance to movement of the motive agent or medium between the blades and thus effect a more rapid discharge relative to the turbine blades 7.

The power shaft 10 of each organization or group A and B projects outwardly through the center of the end portion of the casing or cover plate 113$^a$, the outwardly projecting portion of each shaft in the present instance extending through a bearing 102 embodying a collar 102$^a$ which abuts against a shoulder 10$^a$ of the shaft 10, said collar having a flange 102$^b$ secured to the bearing 102 as shown. It will be understood that this construction of the bearings 102 provides thrust means in connection with each power shaft 10, with obvious advantages in preventing longitudinal movement of the shaft. Within the casing adjacent to the end portion thereof an eccentric 103 is secured on each shaft 10 and has a screw-threaded collar 104 engaged by a correspondingly screw-threaded sleeve 105 held by a tapered key member or bushing 106 extending inwardly and obviating any movement of the eccentric on the shaft and also operating to securely associate the said eccentric with the shaft. An eccentric ring 107 is mounted on the eccentric 103, and secured thereto is a plurality of piston rods 108 and 109, the rod 109 operating as a centering means or to maintain the ring 107 in proper working position relatively to the eccentric. The piston rod 109 carries a piston 110 slidable in a cylinder 111 carried at the inner end of a trunnion member 112 extending through a suitable bearing 113 which is a part of the cover plate or end portion of the casing, as clearly shown by Figs. 2, 2$^a$, 9 and 10. A portion of the ring 107 is enlarged, as at 114, to properly balance the same and also to provide means for steadying the operation thereof and for the attachment of the piston rod 109 and two of the piston rods 108, as shown by Fig. 9. The remaining portion of the ring has regularly spaced bearing bosses or lugs 115 to which the remaining piston rods 108 are movably connected. The piston rods 108 are disposed in pairs, the pairs being connected to opposite ends of the bosses 115 which form bearings and to opposite extremities of the enlargement 114 by means of fulcrum rods 116 in the form of bolts which project beyond these bosses or bearings and the enlarged portion 114 of the eccentric ring 107 and have the inner ends of the pairs of pistons loosely engaging the same, as clearly shown by Figs. 2 and 2$^a$. At relative distances from the eccentric 103 and eccentric ring 107 and the piston rods 108 is a plurality of controlling elements, shown in detail particularly by Fig. 14 and in elevation by Fig. 10. These charge controlling elements each comprises a supporting member 117 embodying a pair of cylinders 118 and 119 respectively having pistons 120 and 121 therein to which the piston rods 108 are connected by a pivotal attachment, as at 122. Extending outwardly from the support 117 is a trunnion 123 freely rotatable in a bearing sleeve 124 secured to or formed as a part of the end portion of the casing, the trunnion 123 being reduced to provide an inner annular shoulder 125 to abut against the inner end of the sleeve 124 to hold each charge controlling element in a fixed operative position or against displacement. The trunnion 123 is longer than the bearing sleeve 124 and extends outwardly beyond the latter for a purpose which will be presently explained. The cylinder 119 of each pair of these cylinders, and as shown by Fig. 14, is disposed at an oblique angle relatively to the remaining cylinder 118 of the pair of cylinders, or the cylinder 118 is vertically straight relatively to the support 117 and the cylinder 119 at an oblique angle to said support. The support 117 together with the cylinders carried thereby and the trunnion 123 move as a unit, or when the trunnion is shifted the cylinders change position. The pistons 120 and 121 in the cylinders 118 and 119 are formed with conical terminals 126 and 127, said terminals being provided with rounded or convex apices and adapted to engage the inwardly projecting ends of the piston rods 75 and 80. On the outer projecting ends of the trunnions 123 and located exteriorly of the end portions of the casing, oscillating or rocking levers 128 are secured so that the said trunnions and levers uniformly move.

Each lever 128 has a long arm 129 and a shorter arm 130, as shown by Figs. 8 and 14, the longer arm 129 having a yoked or bifurcated end 131 movably attached to a slidable core or solenoid 132 of a magnet 133 fulcrumed at its outer end on a post 134 projecting outwardly from the end portion of the casing. The slidable core or solenoid 132 moves inwardly and outwardly through the inner end of the magnet 133 and the latter is free to move in accordance with the change of position of the lever 129 from the normal condition as shown by Fig. 8 so that the solenoid 132 will not bind in the magnet 133. All of the trunnions 123 with their supporting members 117 and cylinders 118 and 119 are connected to similar levers 129 and each has a solenoid 132 and magnet 133 coöperating therewith. In the position of the parts just explained, as shown by Fig. 8, the cylinders 25 and pistons 38 are being supplied with the motive medium or agent, or all of the pistons 120 are in position to cause their apices to regularly engage in sequence the projecting ends or extremities 76 of the piston rods 75 so as to admit charges of the motive agent from the chamber 62 by way of the chamber 71 to the cylinders 25 and pistons 38, and when the two organizations A and B of the complete turbine are arranged to run in alternation the trunnions 123, supporting members 117 and cylinders and pistons carried thereby, as well as the levers 129, solenoids 132 and magnets 133 will have been shifted so as to turn the apices 126 of the pistons 120 out of contacting registration with relation to the inwardly projecting ends 76 of the piston rods 75, and the apices 127 of the pistons 121 are then in registration with the inwardly projecting ends of the piston rods 80 so that air will be admitted to the cylinders 25 of the opposing side of the machine or turbine to cool down the cylinders and pistons which may have just ceased to operate or which have been operating, and from these cylinders and pistons which are being cooled the air passes through the blades 7 of the adjacent turbines 6 into the chamber 99 and then off with the exhaust. When either set of cylinders 25 is thrown out of commission in alternation and has the motive agent or medium cut off therefrom in the manner just explained, the solenoids 132 are drawn inwardly from the magnets 133 and strike stops 135 to limit the movement thereof, the levers 129 being correspondingly rocked or oscillated by the action of springs 136 attached to the short arm 130 of the levers 129 and also to bosses 137 projecting outwardly from each end portion of the casing. Therefore, it will be understood that when the solenoids 132 are drawn into the magnets 133 a pulling tension is exerted on the free ends of the springs 136, and when the magnets 133 are deënergized the springs 136 are free to act and force the solenoids 132 inwardly until the ends of the levers attached to the solenoids strike the stops 135. It will be understood that normally the piston rods 80 have their inner ends clear of operative contact with relation to the apices 127 of the pistons 121 coördinated therewith, and these pistons 120 and 121 are free to expose the conical apices thereof by reason of the fact that the outer ends of the cylinders 118 and 119 are fully open and when the apices 126 and 127 are thrown out of contacting alinement with the inner extremities of the piston rods 75 and 80 the said inner ends of these rods are alined with a portion of the outer ends of the pistons 120 and 121 to one side of the centers of the same. The normal oblique disposition of the cylinders 119 relatively to the supporting members 117 is so calculated that there will be a normal escapement of contact of the apices 127 of the pistons 121 with relation to the inner projecting ends of the piston rods 80. The trunnions 123 together with the supporting members 117 and cylinders 118 and 119 are mounted for individual movement and are free to act independently or to be individually caused to shift and change the regular sequence of operation so that a portion of the cylinders 25 and pistons 38 may have the motive agent or medium fed thereto in each group of the organizations A and B and whereby portions of the cylinders 25 and pistons 38 may be simultaneously operating in each organization if such actuation is desired. This simultaneous operation in the two organizations A and B will be controlled by manual adjustment. Under ordinary conditions, however, the groups of cylinders 25 and pistons 38 will receive the motive agent or medium in regular sequence in each organization, the groups of cylinders and pistons being supplied with the motive agent or medium in alternation and just prior to the completion of the actuation of the last unit of the group that has been operating the first unit of the other group is supplied with the motive agent, and this second group then continues in regular sequence until the units thereof all act and thereby continue the rotation of the turbine shaft 5 through the turbines 6 without fluctuation.

Controllers 138 and 139 are used with the present improved turbine or motor in a manner similar to the structure disclosed in my pending application aforesaid, and these controllers are also of the same type and have a similar operation to those shown by my pending application and are particularly illustrated by Figs. 15, 16, 17 and 18 sufficiently in detail to demonstrate the means for controlling the charging of the several main cylinders hereinbefore explained. Each of these controllers 138 and 139 embodies a half-conducting segment 140 and a half-insulating segment 141 mounted within an inclosure 142 supported by a suitable frame 143 held by a bracket 144 which is secured to one end cover or end portion 113ᵃ of the casing adjacent to the power shaft. A binding post 145 connects with the conducting segment of each controller for a purpose which will be presently pointed out. It will also be understood that between the segmental conducting strip 140 of each controller and the casing 142 a suitable insulating segment will be interposed, or the conducting segment will be insulated from the inclosure or casing, as at 146. A common shaft 147 mounted in suitably supported bearings 148 projects into and through the controllers 138 and 139 in central relation to the latter, and on the opposite extremities of this shaft rotatable contacts 149 are mounted, one on each extremity of the shaft, each contact engaging the segments 140 and 141 in alternation, both rotatable contacts 149 revolving at the same rate of speed with the same. The contacts 149 in the respective controllers 138 and 139 are disposed in reverse positions so that when one is in engagement with the segment 140 the other will be in engagement with the segment 141, and whereby the controllers operate in alternation with respect to the groups of cylinders 25 and pistons 38 controlled thereby. The segments 140 and 141 always remain the same as to proportions relatively to any number of cylinders and pistons that may be used in each organization A and B of the turbine, and it will be understood that when the cylinders and pistons are varied in number in each group the time of operation of each contact 149 will be correspondingly modified through the operating means therefor. In the present instance the conducting segment 140 is of sufficient length to permit all five of the groups of cylinders and pistons in each organization A and B to remain active, provided the full power of the machine is required for the load thereon, and irrespective of the load the sparking plugs of the cylinders, which may be thrown out of commission by means which will be hereinafter explained, remain active, as no irregular explosion would occur in those cylinders and pistons out of commission for the reason that under such conditions no charges of motive agent will be supplied to the cylinders and pistons which are not operating to explode the charges of motive agent. The shaft 147 is suitably insulated to serve as a conducting means for the current from a suitable source of electrical generation, as at W, Fig. 8, and end connecting plugs or devices 150 are associated with or attached to the opposite ends of the shaft 147 for supplying the shaft with electric current from the source of electrical generation, the end connecting plugs or devices being connected to the source of electrical generation and in turn to the contacts 149, the current being taken from the controllers by means of the posts 145 from the segments 140 and conveyed to another part of the apparatus which will be hereinafter more fully specified. The rotating contacts 149 will have a yielding action relatively to the segments with which they engage during their rotation, and it is proposed to use any suitable form of contact device within each controller. On the center of the shaft 147 is a worm wheel 151, and in suitable bearings 152 below the said worm wheel 151 and shaft 147 a shaft 153 is mounted at right angles to the shaft 147 and carries a worm 154 which is held in continual mesh with the worm wheel 151. The shaft 153 is suitably supported by a part of the frame 148 or by any suitable extension of the latter, such as a bracket, as shown, and is provided with a small pulley 155 over which a belt may be trained and also over another operating means consisting of another pulley 156, as shown by Figs. 2 and 2ᵃ. The belt connecting these pulleys 155 and 156 is not shown, as any preferred device of this type may be used for the purpose, the object being solely to drive the shaft 153 at the same rate of speed as each power shaft to which it is connected. Mounted in an upper extension of the frame 143 and in suitable bearings 157 are longitudinally alined shafts 158 having their inner ends abutting and held within an adjusting sleeve 159 so that when said sleeve is oscillated the shafts 158 will be correspondingly moved or partially rotated, and the sleeve 159 may be operated to move the shafts 158 manually by means of an arm 160 carrying a terminal yoke 161 to which a pull rod or analogous device 162 may be connected, or the said yoke 161 may be secured to a part of a governor by any suitable means when it is desired to use a governor with the improved turbine. The arm or lever 160 and the sleeve 159 are integral, or the arm or lever may be described as having a boss, or the sleeve 159, which is bored to fit the shafts 158, forms a part of the said arm or lever. The shafts 158 are slipped into the boss or sleeve 159 at opposite sides of the latter or from both sides of the complete device and abutted at the center so as to allow independent adjustment thereof. The boss or sleeve 159 is secured to the shafts 158 by dowel or set pins 159ᵃ, as shown by Fig. 17. When the turbine is used for instance on an automobile or for driving vehicles, the pull device or rod that may be attached to the yoke 161 will extend to a point where it may be readily accessible in the machine so that the shafts 158 may be preliminarily adjusted for a purpose which will be presently specified. The shafts 158 form portions of controllers or regulators which in the main embody two circular casings 163 and 164, each of which has an insulating ring or annulus 165 therein, as shown by Fig. 15, preferably formed of fiber and secured to the inner inclosing disk or plate 166 which is included within the organization of the casings 163 and 164, the said disk and ring or annulus supporting a plurality of contacts 167 at the inner terminals of stems 168 of binding posts 169, the inner surfaces of the contacts 167 being flush with the inner periphery of the ring or annulus 165. All of the contacts 167 are of equal dimensions and have exactly similar portions thereof exposed for engagement with coöperating means for establishing a circuit through each binding post 169 and its stem 168. On the outer extremities of the shafts 158 within the casings 163 and 164, spiders 170 are fixed and embody a plurality of spring-actuated or yielding arms 171 and carry shoes 172, 173, 174, 175 and 176 on the outer ends thereof, the said shoes being yieldingly held in rotating engagement with the inner periphery of each ring or annulus 165. The shoe 172 of each member of the regulator is the smallest, and the shoes 173, 174, 175 and 176 increase in dimensions, said dimensions being predetermined in accordance with the operation desired, and when each shaft 158 is shifted by the means hereinbefore explained, either automatically or manually, the spiders 170 carrying the arms 171 with the shoes 173 to 176 thereon are similarly shifted or moved within the members of the controllers or regulators in accordance with the load on the turbine or motor or to preliminarily adjust the controllers or regulators to bring each spider 170 in proper position to locate the shoes 173 to 176 relatively to the contacts 167 to either energize or deënergize the magnets 133 of the plungers or pistons 132, as shown by Fig. 8, in accordance with the number of cylinders 25 and pistons 38 desired to be active in each organization A and B and whereby all the shoes of one controller or regulator member may be thrown off or out of engagement with relation to the contacts 167 thereof, and the shoes of the remaining regulator member thrown into engagement with their contacts 167, or to arrange the shoes and contacts in each regulator member so that a portion of the cylinders 25 and pistons 38 will be active or will be supplied with charges of the motive medium in both organizations A and B through the energizing or deënergizing of the plunger or solenoid magnets 133. The several shoes will become engaged with and disengaged from their contacts at different intervals of time proportionately to the dimensions of the several shoes, the shoe 176, which is of maximum dimensions, being the last to become disengaged from its contact and the first to engage said contact; and the next shoe 175 of less dimensions will move to and from its contact before the operation of disengagement and engagement of the preceding shoe 176 relatively to its contact has been effected, and so on through the whole series of shoes to the shoe 172 of each group of shoes, and which latter shoe is of minimum dimensions. The shoe 172 of minimum dimensions will always be the first to become disengaged from its contact and the last to engage said contact. Therefore, when the spiders 170 are shifted by governor or other action it will be understood that the charges to the several cylinders 25 and pistons 38 will be correspondingly regulated and the entire turbine may be adjusted either automatically or manually relatively to the work desired or in accordance with the variations of load on the turbine or motor and a portion of the electric circuits embodying the shoes and contacts just explained will be broken and a portion of the said circuits remain continuous at intervals. The binding posts 169 are five in number in the present instance and are individually electrically connected by suitable wires with the electromagnets 133 as shown, so that the plungers, pistons or solenoids 132 may be readily controlled through the operations of energizing and deënergizing the said electromagnets and as a consequence the trunnions 123 and cylinders 118 and 119 will be shifted either to throw the pistons 120 out of active position relatively to the inner ends 76 of the piston rods 75, and the pistons 121 into active position in relation to the inner ends of the piston rods 80, or vice versa, in view of the fact that the circuits will be automatically varied through the electrical operation of the parts just described; and it will also be understood that a part of the groups or pairs of cylinders 118 and 119 may be shifted or all of each group of the organizations A and B may be simultaneously shifted from one position to the other to render the groups of cylinders 25 and pistons 38 in the two organizations active or inactive as exploding means or as means for supplying the motive agent for delivery to the turbines or causing the said cylinders and pistons to be cooled down by admission of air thereto and to the adjacent turbine of each organization. The controllers or regulators including the spiders and shoes with their contacts have an operation in all respects similar to that disclosed in my pending application and also perform the same function. A controller or regulator of the form hereinbefore described is located at each end of the complete turbine or motor organization and the two controller or regulator mechanisms are connected up for simultaneous operation, it being only necessary to use a single timer organization which is located adjacent to one of the regulator organizations, and by this means the two regulator organizations are caused to simultaneously operate and the shifting of the parts of one will affect the parts of the other so that the active devices of the two regulator organizations will be caused to assume a proper position to effect the operation desired in the two organizations A and B. The timers are electrically connected by wires 177 with the battery W, and the controllers or regulators are electrically connected by wires 178 to the spiders 170 of the controllers or regulators, as shown particularly by Fig. 17. The posts 168 of the contacts 167 of the controllers or regulators are electrically connected by wires 179 to the magnets 133, as particularly shown by Fig. 8.

From the foregoing the operation will be understood, the motive agent being admitted alternately to the opposite groups of cylinders 25 and pistons 38 or to portions of the cylinders and pistons of each group, and in accordance with the preliminary adjustment a certain number of each group of cylinders and pistons may be supplied with the motive agent simultaneously so that both power shafts 10 will be positively driven. When the motive agent is cut off from each group as an entirety or from a portion of the units of each group, as the case may be, the cylinders 25 and pistons 38 which are not being supplied with the motive agent will then be receiving air, and such cylinders and pistons will be cooled down and likewise the portions of the turbines to which the air is regularly delivered from the air charged cylinders and pistons. It will be understood that the pistons 38 may have the motive agent exploded therein at any point between the outer and inner limits of their strokes, and when each cylinder is charged with the motive agent the latter is forced into the chamber 43 on the outstroke of the piston by reason of the fact that the valve 53 will then be open, and as the pressure increases in the chamber 43 by the compression of the motive agent therein the valve 53 will be moved outwardly toward a closing position or will be entirely closed when it reaches the outer limit of its stroke, and by such means all of the motive agent is retained within the chamber 43 of the piston and exposed through the tubular stem 54 to the sparking plugs 31 and exploded by the latter at a predetermined interval, the charge within the chamber 43 being fully burnt before the piston 38 reaches a point of discharge or prior to the registration of the ports 57 with the ports 58. During the inward movement of each piston carrying a charge which is being burnt or subjected to combustion, the valve 53 will remain closed, particularly in view of the pulling stress exerted on the tubular stem 54 of said valve by the inward movement of the piston 38, and no leakage of the charge undergoing combustion in the chamber 43 will ensue, and this charge after combustion will be promptly liberated and pass through the ports 58 by way of the ports 57 to the turbine blades 7 of the turbines 6 at a tangent to said blades owing to the formation of the guides 92 disposed in the enlarged outlet portions 86 of the chambers 85. The exhaust from the turbines rapidly passes off from the chambers 99 through the outlet 100 with the same advantageous operation as explained in my pending application aforesaid. The charges of the motive agent as well as the air to the several cylinders 25 and pistons 38 will be encouraged or induced by the suction set up during the inward strokes of the pistons, the cylinders 25 being gradually filled with the motive agent as the pistons are moving inwardly and while charges within the pistons are undergoing combustion so that when the pistons resume their outward strokes the valves 53 are forced open owing to the outward movement of the pistons and the new charges are immediately stored or compressed within the chambers 43 of the pistons without delay. Likewise, when air is admitted to the cylinders and pistons, fresh charges thereof are rapidly brought into engagement with the heated parts, and as a consequence the cylinders, pistons and turbines are rapidly cooled.

In the present invention the air and gas are taken in through a piston valve adjacent to the cylinder in each instance at the limit of the instroke of the piston, and on the outstroke of the piston the inlet or intake port is closed by the piston and piston valve. The outstroke of the piston causes the charge of motive agent to be forced into the combustion chamber in the piston and the valve having the long tubular stem filled with the motive agent under compression and in communication with the sparking plugs also closes. The sparking plugs and the energizing magneto organization therefor together with governor mechanism that may be used are so arranged for operation as to ignite the charge in the combustion chamber of each piston at a predetermined time on the instroke of the piston and thereby effect complete combustion of the motive agent before it is liberated from the combustion chamber and passes to the adjacent turbine through the guide blades, as shown by Fig. 11. In the construction shown by my pending application hereinbefore referred to, the motive agent is taken in or admitted at the outer portion or top of each of the cylinders and is forced into the combustion chamber of each of the pistons and ignited at the top of the cylinder by means of a side arrangement or entrance where a spark plug is exposed to the interior of the cylinder, and the charge is held against the check valve in the combustion chamber in a burning condition throughout the instroke of the piston and which is liable to cause considerable loss of heat from the motive agent before the latter is liberated to the nozzle ring as shown in my pending application. The purpose of the present invention is to overcome this difficulty. In the pending application the perfect combustion of the charge and the obtainance of the full efficiency of the motive agent would largely depend on the piston speed, and if the piston was running at a low rate of speed a large percentage of heat would be lost before the combustion chamber outlet would register with the outlet of the nozzle ring. In the present invention ignition of the charges takes place near the outlet ports when the pistons are running at a slow rate of speed, and farther and farther away as the speed increases. Furthermore, in my pending application an electromagnetic control mechanism is shown, said mechanism being disposed to oscillate and controlling the operation of a cross-shaft that runs from one group of cylinders to the other by means of an armature organization adjacent to the shaft, the shaft having crank arms at the ends with link connections to an oscillating frame at each end of the motor. These oscillating frames carry electromagnets with armatures on a pivoted lever attached to a trunnion that is a part of the oscillating cylinders carried by each frame, said frame being loosely mounted on a hub or projection of the main casing. In the present improved invention all of this latter mechanism has been eliminated and is replaced by a much simpler organization which consists of a set of cylinders arranged in pairs and having pistons or plungers therein, these cylinders being provided with a trunnion passing through the cover plate at each end of the motor or turbine, and each trunnion having a fixed arm attached to a solenoid plunger or piston 132 operatively engaging an electromagnet 133 so as to give an oscillating movement to the cylinders as the electromagnets are energized and deënergized for controlling the charge of the motive agent to the combustion chambers.

It is proposed to supply the turbine with all necessary structural accessories and devices and as ordinarily used in devices of this class. Moreover, it is proposed to modify the proportions, dimensions and general details of construction within the scope of the invention.

What is claimed is:

1. In a gas turbine, power generating turbines having separated groups of elements, distinct groups of cylinders having pistons therein and to which charges of the motive agent are supplied and undergo combustion for feed to the elements of the turbines, and electrically controlled means operative for alternately supplying and shutting off a motive agent to and from the cylinders and pistons and operative to deliver the motive agent to all the units of each group of cylinders and pistons in alternation or to portions of the units of each group simultaneously.

2. In a gas turbine, power generating turbines, cylinders and pistons arranged in groups adjacent to the turbines to receive and discharge the motive agent to the turbines, and electrically operated mechanism for controlling the admission of the motive agent to the cylinders and pistons of each group in succession, or to a portion of said cylinders and pistons in each group in alternation, or to portions of the cylinders and pistons of each group simultaneously in the groups.

3. In a gas turbine, revolubly active turbines alternately operating as power generating means, groups of cylinders and pistons independently coöperating with the turbines, and electrically operated mechanism controlling the delivery of charges of a motive agent in succession to the cylinders and operating to supply and shut off the motive agent to and from the groups to render one group active while the other is inactive and also including means for delivering air to the inactive groups, the said mechanism being also adjustable to effect the simultaneous operation of portions of the cylinders and pistons in the two groups.

4. In a gas turbine the combination with a power generating turbine, of a group of cylinders and pistons, each cylinder and piston of the group having automatically operating electrically controlled devices coöperating therewith for alternately supplying and shutting off a motive agent to and from the same and for supplying cooling air thereto when the motive agent is shut off therefrom, the said devices being operative to deliver the motive agent and air to all the cylinders and pistons of each group in succession or to only a part of said cylinders and pistons of each group, or to portions of the units of each group simultaneously.

5. In a gas turbine, the combination of an inclosing casing, a power generating turbine within the casing, a group of cylinders and pistons in the casing for operating on and discharging a motive agent to the turbine, mechanism consisting of feed controlling pistons and cylinders for regulating the feed of the motive agent to the said first named group of cylinders and pistons, and electrically actuated devices for controlling the operation of the said feed controlling cylinders and pistons.

6. In a gas turbine, power generating turbines, two groups of cylinders independently coöperating with the turbines and having pistons therein, devices for automatically supplying and shutting off a motive agent to and from the groups of cylinders and pistons in alternation and embodying feed controlling cylinders and pistons, and electrically actuated mechanism for rendering the feed controlling cylinders and pistons operative as a whole in sequence relatively to the groups of cylinders and pistons or for causing one or more of said feeding cylinders and pistons to be active as feeding means.

7. In a gas turbine, power generating turbines, groups of cylinders and pistons independently coöperating with the turbines, and corresponding groups of motive agent and air feed controlling pistons and cylinders coöperating with the first named groups of cylinders and pistons and automatically supplying and shutting off the motive agent and air to and from the said first named groups of cylinders and pistons in alternation, the feed controlling pistons and cylinders being arranged in pairs and opening into distinct chambers individually common to each pair and also in communication with the first named cylinders.

8. In a gas turbine, power generating turbines, groups of cylinders and pistons independently operating to receive charges of a motive agent and prepare the latter for discharge to the turbines, and electrically actuated means for automatically supplying and shutting off a motive agent or air to and from the groups of cylinders and pistons in alternation, the motive agent or air being delivered to a common chamber distinct with relation to and having communication with an intermediate portion of each cylinder.

9. In a gas turbine, power generating turbines, groups of cylinders and pistons independently coöperating with the turbines, each cylinder having an intermediate portion in communication with a distinct chamber, and devices arranged to have communication with the said chamber of each cylinder to alternately deliver charges of a motive agent and air to the chamber and thence to the cylinder in communication therewith.

10. In a gas turbine, power generating turbines, groups of cylinders and pistons independently coöperating with the turbines, each cylinder having a distinct motive agent and air feeding chamber in communication with an intermediate portion thereof, and devices for automatically and independently delivering a motive agent or air to the chambers and from the latter to the groups of cylinders in alternation.

11. In a gas turbine, power generating turbines, groups of cylinders and pistons independently coöperating with the turbines, automatically operating means for alternately supplying and shutting off a motive agent to and from all of the units of the groups of cylinders and pistons or only a part of the units of each group of the latter, and guide means interposed between the cylinders and the turbines at the outlets of the cylinders and embodying a series of curved passages converging toward their outlets for tangentially directing the motive agent as treated by the cylinders and pistons to the turbines to operate the latter.

12. In a gas turbine, power generating turbines, groups of cylinders and pistons independently coöperating with the turbines, automatically operating means for alternately supplying and shutting off a motive agent to and from the groups of cylinders and pistons, the pistons having combustion chambers provided with outlet ports and tubular stems and the cylinders having inlet and outlet ports, the charges being stored and automatically held in the pistons after combustion until the outlet ports of the combustion chambers register with the outlet ports of the cylinders, and guides interposed between the cylinders and the turbines at the outlets of the cylinders and embodying a plurality of blades disposed at an angle to the turbines and defining converging passages for tangentially directing the motive agent as treated by the cylinders and pistons to the turbines to operate the latter.

13. In a gas turbine, power generating turbines, groups of cylinders and pistons independently coöperating with the turbines, the cylinders having inlet and outlet ports and the pistons having combustion chambers with automatically operating closing valves and outlet ports to register with the outlet ports of the cylinders, the pistons also being provided with tubular stems, automatically operating means for alternately supplying and shutting off a motive agent to and from the groups of cylinders and combustion chambers of the pistons, ignition means exposed to the combustion chambers through the said stems, and guides interposed between the cylinders and the turbines at the outlets of the cylinders and embodying a plurality of blades tapering toward their opposite ends and disposed at an angle to the turbines and having passages between the blades for tangentially directing the motive agent as treated by the cylinders and pistons to the turbines to operate the latter.

14. In a gas turbine, power generating turbines, groups of cylinders independently coöperating with the turbines, and mechanism for automatically supplying and shutting off a motive agent and air to and from the said groups in alternation and embodying cylinders with pistons disposed in distinct pairs and pairs of reciprocating devices for actuating the said pistons, the one reciprocating device being at an angle to the other in each pair of said devices.

15. In a gas turbine, power generating turbines, groups of cylinders independently coöperating with the turbines, and mechanism for automatically supplying and shutting off a motive agent and air to and from the said groups in alternation and embodying distinct pairs of cylinders and pistons with coöperating pairs of individually oscillatable reciprocating devices for actuating said pistons, the one reciprocating device of each pair being normally at an angle to the other.

16. In a gas turbine, power generating turbines, groups of cylinders independently coöperating with the turbines, mechanism for automatically supplying and shutting off a motive agent and air to and from said groups of cylinders in alternation and embodying distinct pairs of cylinders and pistons with coöperating pairs of individually oscillatable reciprocating devices for actuating said pistons, the one reciprocating device of each pair being normally at an angle to the other, and electrically actuated mechanism for automatically oscillating the pairs of reciprocating devices as a whole or individually.

17. In a gas turbine, power generating turbines, groups of cylinders independently coöperating with the turbines and having means for automatically supplying and shutting off a motive agent and air to and from the groups of cylinders in alternation, pistons in the cylinders provided with explosion and combustion chambers wherein the motive agent is stored under pressure by the movement of the pistons in the cylinders, and valves carried by the pistons to close the chambers of the latter and provided with elongated tubular stems for exposing the charges in the pistons to exploding means.

18. In a gas turbine, power generating turbines, groups of cylinders independently coöperating with the turbines and having electrically controlled means for automatically supplying and shutting off a motive agent and air to and from the groups of cylinders in alternation, pistons in the cylinders provided with explosion and combustion chambers wherein the motive agent is stored under pressure by movement of the pistons in the cylinders, valves carried by the pistons to automatically close the said chambers of the latter and provided with tubular stems, and exploding means to which the charges of motive agent under pressure in the piston chambers are exposed through the tubular valve stems.

19. In a gas turbine, power generating mechanism having an inlet and outlet for a motive agent and a piston embodying a combustion chamber, a valve carried by the piston to automatically close the combustion chamber, the valve being provided with a tubular stem, and ignition means at the outer portion of the power generating mechanism, the combustion chamber being charged when the piston is at its outward limit of stroke and ignition of the charge taking place through the tubular stem when the piston moves inwardly.

20. In a gas turbine, power generating mechanism embodying a cylinder having an inlet and outlet and a piston with a combustion chamber having automatically operating closing means, and an ignition means at the outer end of the cylinder, the combustion chamber being charged when the piston is at its outermost stroke limit and ignited through the chamber closing means when the piston moves inwardly.

21. In a gas turbine, power generating mechanism embodying a cylinder having an inlet and outlet and a piston with a combustion chamber having a closing valve with a tubular stem, and ignition means exposed to the combustion chamber through said valve stem.

In testimony whereof I have hereunto set my hand in presence of two subscribing witnesses.

LEWIS A. HAINES.

Witnesses:
C. D. FAVIERS,
WM. K. WILLIAMS.